F. A. EUSTIS.
METHOD OF PREPARING FINE ORES FOR SINTERING AND THE PRODUCT THEREOF.
APPLICATION FILED MAY 21, 1919.
1,341,890. Patented June 1, 1920.
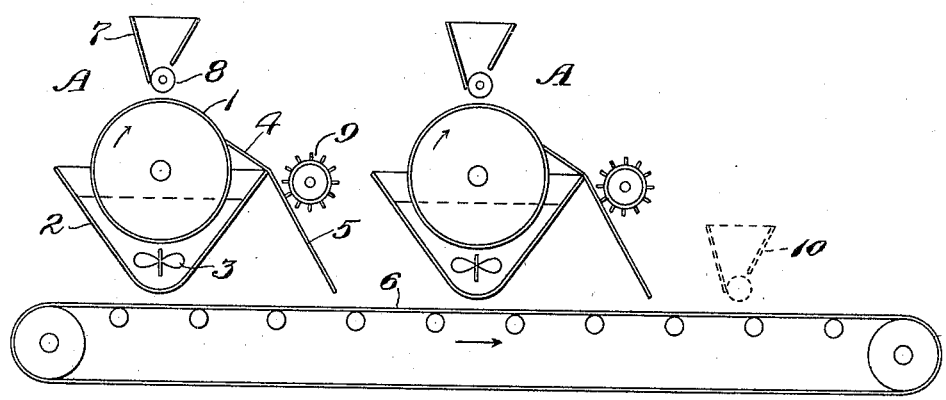
Inventor;
Frederic A. Eustis,
by Roberts, Roberts & Cushman
Attys.

UNITED STATES PATENT OFFICE.

FREDERIC A. EUSTIS, OF MILTON, MASSACHUSETTS.

METHOD OF PREPARING FINE ORES FOR SINTERING AND THE PRODUCT THEREOF.

1,341,890.         Specification of Letters Patent.         Patented June 1, 1920.

Application filed May 21, 1919. Serial No. 298,685.

*To all whom it may concern:*

Be it known that I, FREDERIC A. EUSTIS, a citizen of the United States of America, and resident of Milton, in the county of Norfolk and State of Massachusetts, have invented new and useful Improvements in Methods of Preparing Fine Ores for Sintering and the Product Thereof, of which the following is a specification.

It has heretofore been the practice to prepare fine ores for sintering by beating up or mixing the ore while in a moist condition, to loosen and lighten the mass so as to permit the air and gases readily to pass through the mass when the ore is placed in the sintering apparatus mixed with coal, coke or other fuel.

The principal objects of the present invention are to effect certain economies in the mode of preparing fine ores for sintering, and to improve the condition of the ore for sintering by combining the fuel with the ore in such manner as to secure better combustion, by securing a more intimate and uniform mixture of the fuel with the ore, and by agglomerating the particles into lumps or pieces to render the mass more porous, so that in the sintering process air and gas will pass through it more readily, than has been possible by methods heretofore used.

In carrying out these objects, the ore in the state of a pulp, that is, suspended in water, is filtered to remove the bulk of the water, and the fine ore is delivered from the filter in the form of a filter cake, which is a more or less tough, leathery sheet of ore possessing substantial cohesion. Sintering requires a certain amount of water in the ore, and the filter can conveniently be adjusted to leave about the desired amount of water in the filter cake.

Many fine ores that are ultimately to be sintered are first leached, or treated with solutions for other purposes, and are thereby made into pulp. Certain ores also, such as the soft iron ores found on the north coast of the island of Cuba (for which the present method is particularly well adapted) naturally contain much water and may be economically mined by the hydraulic method and brought to the works in a state of pulp. Other ores not already in a state of pulp may be pulped by the addition of water and treated by my improved method.

The filter used for producing the filter cake is preferably of a continuous type but other kinds may be used.

The fuel is then sprinkled or sprayed on to the moist filter cake after the same is formed, thus spreading the fuel uniformly over the surface of the filter cake, to which it adheres. The particles of fuel are thereby uniformly distributed over the filter cake in the form of a surface coating and are intimately associated with and attached to the surface of the filter cake. The latter when cut up or broken up into small pieces will be in excellent condition for sintering.

In order to set forth the invention with more particularity, reference may be had to the accompanying drawings which illustrate in diagrammatic form apparatus for practising the invention.

A indicates a filter of usual type, comprising a rotary cylindrical drum 1, having perforate walls extending down into a trough or tank 2. Suction apparatus is connected as usual to the interior of the drum for maintaining a partial vacuum over the desired segmental area of the drum. Paddles or beaters 3 in tank 2 prevent the solids from settling out of the pulp and effect a thorough and uniform mixing of the materials.

As the drum, partially submerged in the pulp, rotates in the direction of the arrow, the mixed ore and fuel is picked up by reason of the suction and carried over in the form of a thin layer or sheet (usually only a fraction of an inch in thickness) from which the bulk of the water is filtered out.

On the descending side of the drum, just before it again enters the tank, an inclined scraper or knife 4 is arranged with its edge close to the periphery of the drum to remove the filter cake from the surface of the drum. The filter cake passes down over the upper side of knife 4, and down the chute or slide 5, and thence passes on to the continuously traveling conveyer belt 6 from which the material is delivered to the sintering apparatus (not shown).

The finely divided coal or coke is sprinkled or sprayed from a feeder chute 7 on to the filter cake as it is carried over on the drum. The delivery of the fuel may be regulated by a feed roll 8. As the cake is moist and somewhat plastic the fuel will adhere to the filter cake and be slightly embedded therein, which effect is somewhat aided by the suction within the drum.

The filter cake, thus sprayed and coated with the finely divided fuel must be cut up or divided into pieces of suitable size to make a porous charge for sintering. This may be accomplished by a cutter 9 consisting of a rotating cylinder with knives arranged on its periphery to cut up the cake into small cubes or other forms according to the arrangement of the knives, thus dividing the cake into separate lumps or pieces suitable for sintering. The material thus prepared may be carried directly into the sintering apparatus by the conveyer 6. Or the filter cake may be delivered into an ordinary pug mill by which it is cut up preparatory for sintering.

Any convenient and desired number of filters with their adjuncts may be used for preparing the material and depositing it on the conveyer 6, two being shown in the drawings by way of illustration.

Other means for breaking up or dividing the filter cake may be employed; and if the cutters 9 are omitted the fuel may be sprinkled or sprayed on the filter cake after it leaves the drum, as illustrated in dotted lines by the feeder chute 10, which is placed over the conveyer 6 instead of over the drum.

As the material is prepared by distributing the fuel on the surface of the filter cake, the fuel particles are exposed on the outside of the cake where they are best exposed to the flame and to the air or oxygen that is blown through the charge, and therefore best adapted to promote good combustion.

The process affords an economical and ready method of handling fine, sticky ores without drying or incurring dust losses in preparing the same for sintering.

I claim:

1. The method of preparing fine ore for sintering, which comprises making the ore into a filter cake, and sticking finely divided particles of fuel to the outside surface of the filter cake.

2. The method of preparing fine ore for sintering, which comprises making the ore into a filter cake, sticking finely divided particles of fuel to the outside surface of the filter cake, and dividing the filter cake into pieces of suitable size to make a porous charge for sintering.

3. Fine ore conditioned for sintering, comprising a mass of small pieces of agglomerated particles of the ore having finely divided fuel stuck to the outer surface of the pieces.

Signed by me at Boston, Massachusetts, this 20th day of May, 1919.

FREDERIC A. EUSTIS.